United States Patent

[11] 3,609,490

| [72] | Inventor | Leroy R. Keranen |
| | | Lawndale, Calif. |
| [21] | Appl. No. | 19,910 |
| [22] | Filed | Mar. 16, 1970 |
| [45] | Patented | Sept. 28, 1971 |
| [73] | Assignee | TRW Inc. |
| | | Redondo Beach, Calif. |

[54] TWO PHASE MOTOR DRIVE CIRCUIT
9 Claims, 3 Drawing Figs.

| [52] | U.S. Cl. | 318/227, 318/138 |
| [51] | Int. Cl. | H02p 5/40 |
| [50] | Field of Search | 318/254, 138, 227 |

[56] References Cited
UNITED STATES PATENTS

| 2,995,690 | 8/1961 | Lemon | 318/138 |
| 3,281,631 | 10/1966 | Von Delden et al. | 318/138 |
| 3,321,661 | 5/1967 | Toth et al. | 318/138 |

Primary Examiner—Gene Z. Rubinson
Attorneys—Daniel T. Anderson, Harry I. Jacobs and Gerald Singer

ABSTRACT: A circuit for providing base drive to the output stages of a square wave motor drive circuit. The output stage of a motor drive circuit comprises two output transistors. The collector current of each output transistor is sampled by the primaries of two current transformers wound on the same core for DC cancellation. The secondary of each current transformer drives the base of its respective output transistor.

INVENTOR.
Leroy R. Keranen

INVENTOR.
Leroy R. Keranen
BY
ATTORNEY 3,609,490

TWO PHASE MOTOR DRIVE CIRCUIT

BACKGROUND OF THE INVENTION

In certain spacecraft applications a flywheel is driven at a constant speed for a long period of time. For that application, high power levels are required to accelerate the wheel and substantially lower power levels are needed to maintain the wheel at a constant speed. Direct current from the batteries of the spacecraft is the only power source available to drive the motor.

It would at first appear that a DC motor is the logical choice to drive the wheel. One reason a DC motor is disadvantageous for spacecraft use is the inherent need for a commutator and brushes. In space the vibrations to which a spacecraft is subject entail the use of special commutators and brushes. This is expensive, and frequently adds unnecessary weight. Furthermore, since the speed of a DC motor is proportional to the supply voltage, sophisticated voltage controls must be employed to maintain a constant speed despite voltage variations.

Because of the above mentioned problems inherent in DC motors, AC induction or synchronous motors are generally used for spacecraft applications.

A well known scheme for driving an AC motor at a constant speed from a DC source comprises a square wave generator for converting the DC into AC drive for the motor, and a means for closely controlling the frequency of the output of the square wave generator to maintain constant speed. Such a scheme is disadvantageous because, by necessity, high powered solid state components are needed to generate the square wave. Frequently, a low power square wave is generated, and then amplified. The amplified square wave then provides the necessary motor drive. The square wave amplifier usually comprises a pair of transistors operated in a push-pull manner. The bases of the transistors are driven by the output of the square wave generator, and the collector currents drive the motor. The transistors of the push-pull amplifier must be able to handle the peak start up current, although for the remainder of their duty cycle they need only handle the substantially lower, steady state current. Thus, expensive high power rated transistors are needed.

One attempt at reducing the power rating of such push-pull output transistors is disclosed in U.S. Pat. No. 2,995,690 to R. S. Lemon. The Lemon patent discloses a transistorized push-pull motor drive circuit wherein a feedback winding inductively coupled to the control windings of an AC motor supplies base drive to the push-pull transistors. The feedback winding supplies part of the necessary base drive for the transistors, thus permitting reduction of the power rating of the push-pull transistors.

The circuit of the Lemon patent is disadvantageous as it requires an AC motor having a feedback winding.

It would be desirable to produce a circuit for amplifying a low power square wave capable of driving a standard AC motor for spacecraft applications.

SUMMARY OF THE INVENTION

In accordance with an example of a preferred embodiment of the present invention a means for driving a standard AC motor from a DC source by amplifying the output of a square wave generator is disclosed.

An AC induction motor is driven by a square wave generator, the output of which is amplified by an example of one embodiment of the present invention.

The amplifier includes a push-pull transistor output stage. The collector current of each transistor is monitored by the primary of a current transformer. The two current transformers are wound on the same core to provide DC current cancellation. The secondary of each current transformer controls the base current to the output transistors thus providing a feedback path to permit the output transistors to operate at low power levels with collector current waveforms that have high peak-to-average values.

DESCRIPTION OF THE PREFERRED EMBODIMENTS

Figure 1:
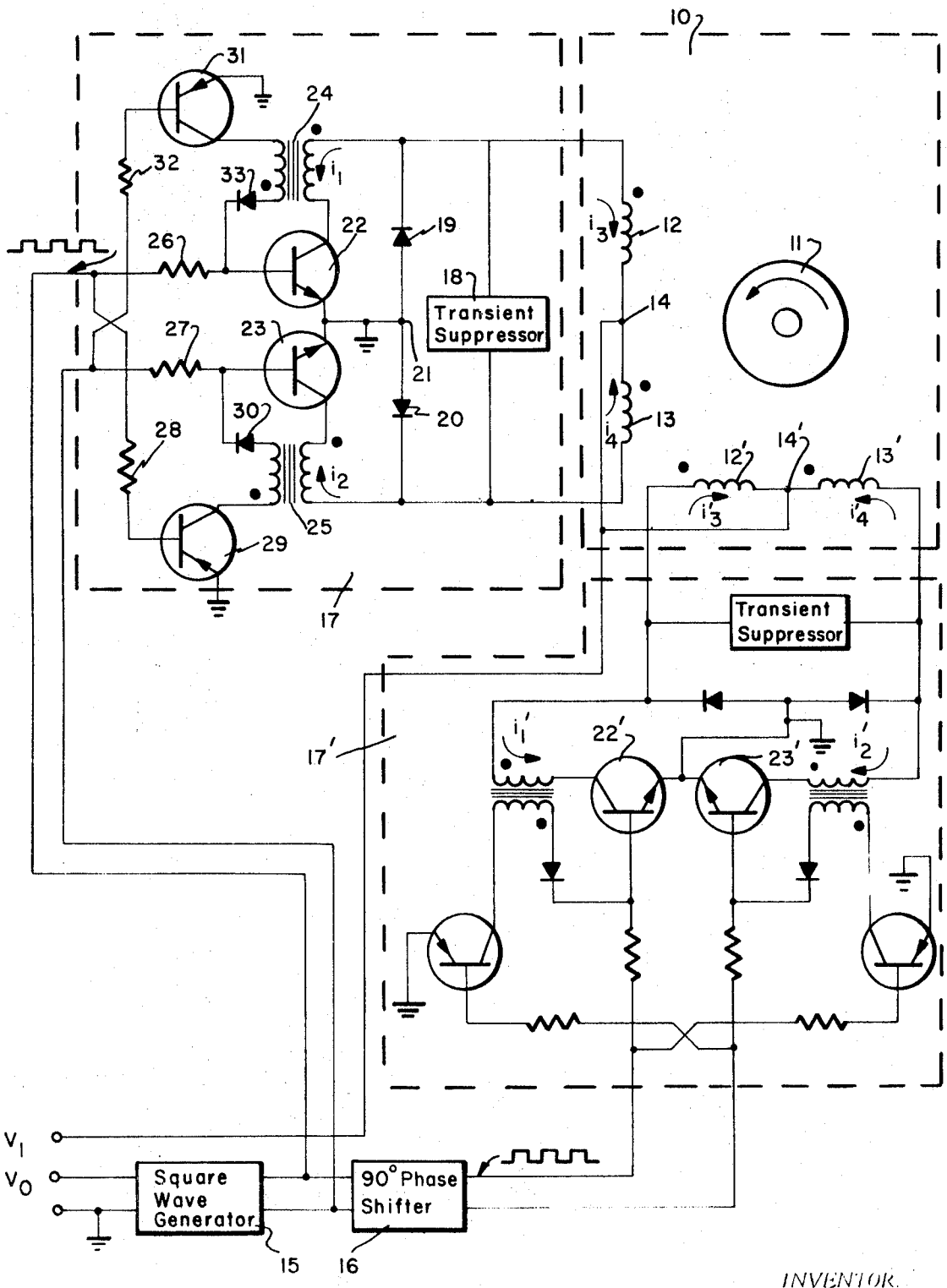
FIG. 1 is a schematic of a two phase motor control circuit including a pair of proportional base drivers.

Referring to FIG. 1, there is shown an induction motor 10 having rotor 11, and provided with two windings 12–13 and 12'–13a⅔ which are center tapped at points 14 and 14' respectively. The center taps are tied together and driven by a direct current voltage $V_1$.

A square wave generator 15 drives motor winding 12–13 through a first proportional base driver 17. Motor winding 12'–13a⅔ is driven by the square wave generator 15 via a 90° phase shifter 16 and a second proportional base driver 17'. The out of phase drive between proportional base driver 17 and 17' is needed to operate the two phase induction motor 10. The square wave generator 15 is driven by a constant direct current voltage source $V_o$.

Referring to proportional base driver 17, a transient suppressor 18 is coupled across the output of proportional base driver 17 to motor winding 12–13. Back to back diodes 19 and 20 are shunted across transistors 22 and 23 and the primaries of transformers 24 and 25.

The junction 21 of the anodes of diodes 19 and 20 is grounded and also connected to the emitters of transistors 22 and 23. It should be noted that this junction may lead to a negative direct current terminal rather than ground if square wave generator 15 provides ground isolation. The primary of a first current transformer 24 is connected in series with the collector of transistor 22. Similarly, the primary of a second current transformer 25 is connected in series with the collector of transistor 23.

The output of square wave generator 15 is connected to the bases of transistors 22 and 23 via resistors 26 and 27 respectively.

One side of the output of square wave generator 15 is connected via resistor 28 to the base of a transistor 29. The emitter of transistor 29 is grounded. The secondary of current transformer 25 is coupled across the collector of transistor 29 and the base of transistor 23. A diode 30, having its cathode connected to the base of transistor 23, is in series with the secondary of transformer 25.

The base of a transistor 31 is coupled to the second side of the output of square wave generator 16 via a resistor 32. The emitter of transistor 31 is grounded. The secondary of transformer 24 is coupled between the collector of transistor 31 and the base of transistor 22. A diode 33 having its cathode connected to the base of transistor 22 is in series with the secondary of current transformer 24.

The input to proportional base driver 17' is connected across the output of 90° phase shifter 16. Driver 17' is identical to driver 17.

In operation transistors 22 and 23 are rendered alternately conducting by the square wave output from square wave generator 15. When transistor 22 conducts, transistor 23 is shut off and a current $i_3$ flows through motor winding 12 to ground in the direction shown. Conversely, when transistor 23 conducts, transistor 22 does not conduct, and a current $i_4$ flows to ground through motor winding 13 in the direction shown. Similarly when transistor 22' of proportional base driver 17' conducts, transistor 23' does not conduct and a current $i_3'$ flows through motor winding 12' in the direction shown. When transistor 23' conducts, transistor 22' does not conduct and a current $i_4'$ flows through motor winding 13' in the direction shown. Because of the close coupling of windings 12 and 13, when the base drive switches from transistor 22 to transistor 23, current $i_3$ flowing in winding 12 immediately starts to flow in winding 13, and then to ground through diode 20, but in the direction opposite to that shown as $i_4$. As will be seen later, after transistor 22 is turned on for a while, the current direction reverses, and transistor 23 begins to conduct. Similarly, the magnitude of the current flowing in winding 12' equals the magnitude of the current flowing in winding 13'.

Since the square wave drives to proportional base driver 17 and 17' are 90° out of phase, the currents in windings 12-13 and 12'-13' are likewise out of phase. The out of phase relationship causes rotor 11 to rotate in the direction shown.

Current transformers 24 and 25 are wound on the same core to provide for DC current cancellation. Thus the DC component of $i_1$, the current flowing through the primary of transformer 24, and the DC component of $i_2$, the current flowing through the primary of transformer 25 cancel. This cancellation prevents the transformers from saturating, thus less iron is needed to handle the resulting flux, yielding a saving in weight.

Since transistors 22 and 23 drive the highly inductive load comprising winding 12-13, currents $i_1$ and $i_2$ have high peak-to-average waveforms. Back to back diodes 19 and 20 are used to handle the reactive current resulting from the inductive nature of control winding 12-13. The leakage inductance of motor windings 12-13 necessitate the use of a transient supressor 18 to prevent damage to the transistors.

The output of square wave generator 15, which drives proportional base driver 17, is shown in FIG. 2A and labeled drive signal. When the drive signal causes the base of transistor 22 to go positive, the base of transistor 23 goes negative. Transistors 22 and 31 are turned on and transistors 23 and 29 are turned off. FIGS. 2B and 2C show currents $i_1$ and $i_2$. During the first portion of one drive signal cycle period, current $i_1$ is negative and diode 19 conducts reactive current to ground. When current $i_1$ goes positive, a current flows from ground through the collector-emitter path of transistor 31, the secondary of transformer 24, and diode 33 to provide base drive for transistor 22. The drive to the base of transistor 22 is thus in part proportional to $i_1$, the ratio being determined by the turns ratio of transformer 24.

When current $i_2$ goes positive, a current flows from ground through the collector-emitter path of transistor 29, the secondary of transformer 25 and diode 30 to provide base drive for transistor 23. The base drive of transistor 23 is thus in part proportional to $i_1$, the ratio being determined by the turns ratio of transformer 24. Transistor 31 is turned on via resistor 32 when transistor 23 is turned on by the input drive. Similarly, transistor 29 is turned on via resistor 28 when transistor 22 is turned on by the square wave input drive.

Note that the transient suppressor network 18 suppresses any transients in winding 12-13 caused by the leakage inductance of that winding. If transient suppressor network 18 were not present, a large transient at the collector of either transistor 22 or 23 could damage those transistors.

Resistor 26 insures that a small amount of base current will be supplied to transistor 22 to make sure that it is turned on. Similarly resistor 27 supplies a small amount of base current to transistor 23 to insure that it is turned on whenever the drive signal goes negative.

Just prior to the time when transistor 22 turns off, current $i_3$ flows through control winding 12. At the instant current $i_1$ crosses from negative to positive, switching from transistor 22 to 23 occurs. Because of the close coupling between windings 12 and 13, when transistor 22 turns off, a current $i_4$ flows in winding 13 so that the magnitude of current $i_4$ equals the magnitude of current $i_3$; however, the currents are of opposite polarity. When current $i_4$ is negative, it flows through diode 20 to ground. After a time determined by the resistance and inductance of the motor windings, current $i_4$ reverses and transistor 23 then conducts. Just prior to the time when transistor 23 turns off, current $i_4$ flows through winding 12. At the instant $i_2$ crosses from negative to positive, switching from transistor 23 to 22 occurs. Because of the close coupling between windings 12 and 13, when transistor 23 turns off, a current $i_3$ flows in winding 12 so that the magnitude of current $i_3$ equals the magnitude of current $i_4$; however, the currents are of opposite polarity. When current $i_3$ is negative, it flows through diode 19 to ground. After a time determined by the resistance and inductance of the motor windings, current $i_3$ reverses and transistor 22 then conducts.

Transistors 29 and 31 switch in the appropriate secondary of either transformer 24 or 25 in response to the input drive signal from square wave generator 15. Diode 33 prevents the base current to transistor 22, supplied by resistor 26, from being diverted through transformer 24 and transistor 31 to ground when diode 19 is conducting. Similarly, diode 30 prevents the base current to transistor 23, supplied by resistor 27, from being diverted to ground through transformer 25 and transistor 29 when diode 20 is conducting.

The base drive of transistor 22 is thus made up of two components. The first component is a small current supplied from resistor 26 and the much larger portion is supplied by the secondary of transformer 24. Similarly, the base drive of transistor 23 consists of one component from the current supplied by resistor 27, and a larger component supplied by the secondary of transformer 25.

Regardless of the waveforms of collector currents $i_1$ and $i_2$, the base currents to transistors 22 and 23 will be proportional to collector currents $i_1$ and $i_2$, and the ratio will be determined by the turns ratio of transformers 24 and 25.

Supplying the base current via proportional base driver 17 is more efficient than supplying base current directly to transistors 22 and 23 from the square wave generator. The efficiency is increased because the current needs of winding 12-13 determines the base drive power that must be supplied to transistors 22 and 23.

Figure 2:
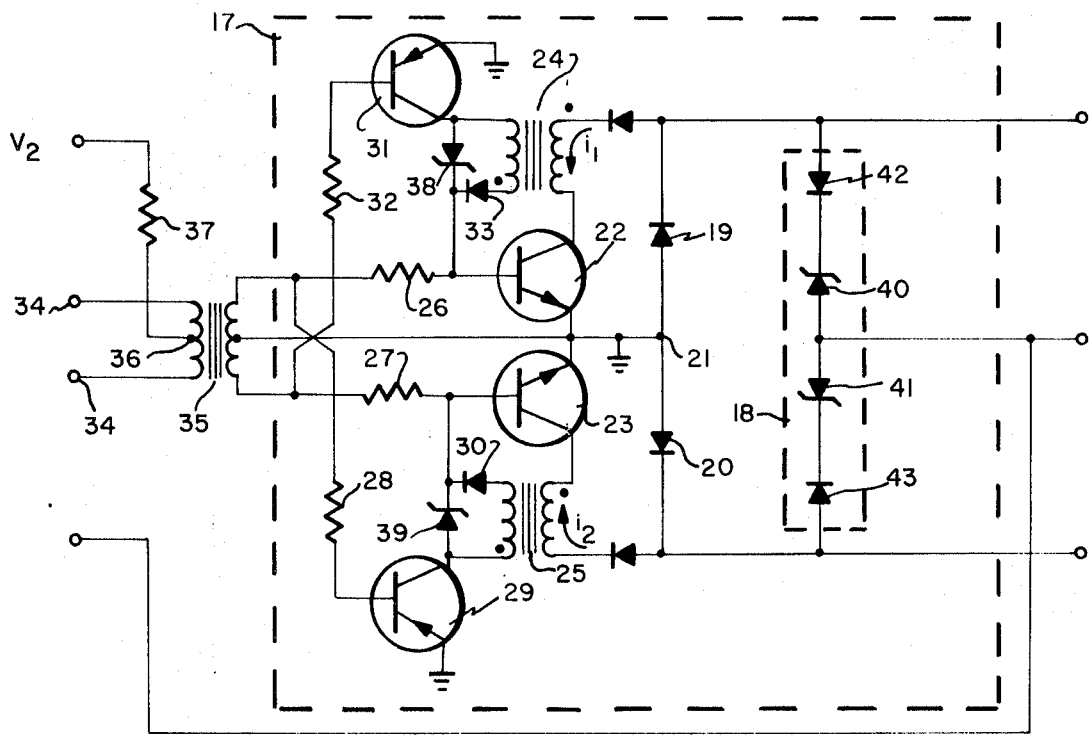
FIG. 2 is a schematic diagram of a proportional base driver according to the invention.
Figure 3:
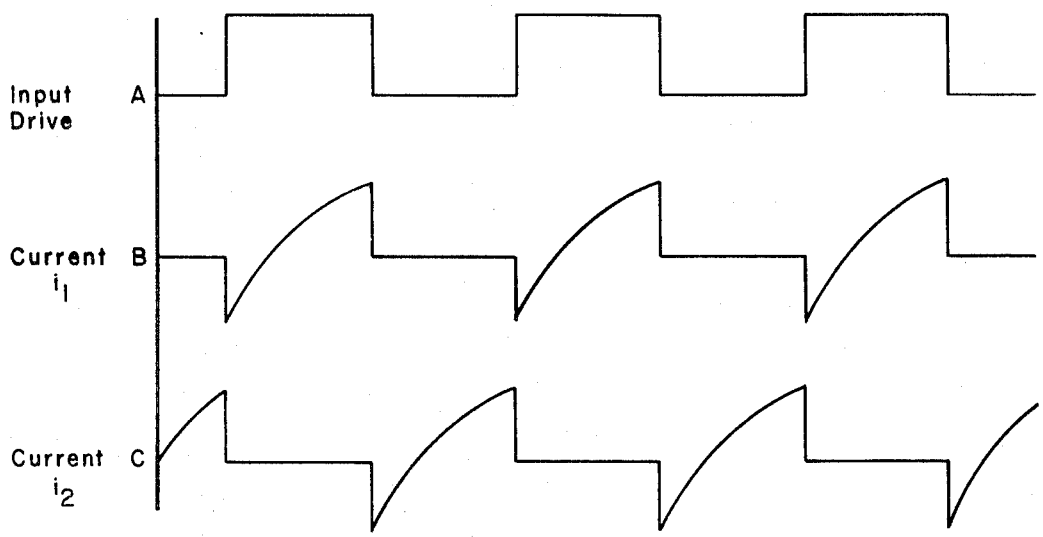
FIG. 3 is a graph of various waveforms of the circuit of the present invention.

FIG. 2 shows a schematic diagram of another embodiment of proportional base driver 17. The embodiment of FIG. 2 includes an additional transformer 35 interposed between square wave generator 16 and the proportional base driver 17 of FIG. 1. Transformer 35 has a turns ratio that optimizes coupling a DC voltage source $V_2$ to drive the bases of transistors 22 and 23. The primary of transformer 35 is center tapped at point 36 and the secondary is center tapped and grounded. Direct current voltage $V_2$ is fed into point 36 via resistor 37 as a safety device. In the event of the failure of the input drive, voltage $V_2$ will cause transformer 35 to saturate and cutoff drive to the circuit. The value of resistor 37 is chosen to permit easy saturation. When transformer 35 saturates, it effectively shorts out to prevent any secondary voltage from developing.

The circuit of FIG. 2 also includes a zener diode 38 interposed between the collector of transistor 31 and the base of transistor 22 so that the cathode of zener diode 38 connects to the base of transistor 22. Similarly, a zener diode 39 connects the collector of transistor 29 to the base of transistor 23 so that the cathode of zener diode 39 is connected to the base of transistor 23. Zener diodes 38 and 39 suppress transients caused by secondary leakage inductance from transformers 24 and 25 to protect transistors 31 and 29 respectively.

Transient suppressor 18 is shown in detail in FIG. 2. The transient suppressor comprises a zener diode 40 in series with diode 42. The cathodes of zener 40 and diode 42 are tied together, and the cathodes of a zener diode 41 and a diode 43 are tied together. The anodes of zener diodes 40 and 41 are connected to voltage $V_1$, permitting recovery of some of the power lost in the transient suppression circuit. This four diode network provides transient suppression against leakage inductance in the windings of motor 10.

It should be noted that the speed of rotor 11 of induction motor 10 is proportional to voltage $V_1$. It is within the scope of this invention to use a feedback system to control voltage $V_1$ to keep the speed of motor 10 constant. For example, an analog or digital speed control could be used for this purpose.

What is claimed is:

1. In a circuit for driving each winding of an alternating current motor of the type having each winding center tapped, the center tap driven by a direct current source, first and second output transistors, said winding driven via the collector-emitter paths of said first and second transistors, and the bases of said first and second transistors driven by a square wave, the improvement comprising:

first and second current transformers;

the primaries of said first and second current transformers connected in series with the collector-emitter paths of said first and second transistors respectively and said motor winding; and the secondaries of said first and second current transformers driving the bases of said first and second transistors.

2. A circuit as claimed in claim 1 wherein said first and second current transformers are wound on the same core to provide for direct current cancellation.

3. The circuit as claimed by claim 1 and further including:

third and fourth transistor switches;

the collector-emitter path of said third transistor connected in series with the secondary of said first current transformer;

the base of said third transistor driven by the square wave drive to the base of said second transistor;

the collector-emitter path of said fourth transistor connected in series with the secondary of said second current transformer; and the base of said fourth transistor driven by the square wave drive to the base of said first transistor.

4. The circuit as claimed by claim 1 and further including a transient suppressor shunted across the winding of said motor driven by the circuit.

5. A circuit for driving a two phase alternating current motor, wherein each winding of said motor is center tapped, from a source of direct current power comprising:

means coupling the source of direct current power to the center tap of each winding;

a square wave generator driven by said source of direct current power;

a first circuit driven by said square wave generator driving the first phase windings of said motor;

a 90° phase shifter driven by said square wave generator;

a second circuit identical to said first circuit driven by said phase shifter driving the second phase windings of said motor.

6. The circuit as claimed in claim 5 wherein said first and second circuits are identical and comprise:

first and second transistor switches;

means connecting the bases of said first and second transistors to said square wave generator;

means grounding the emitters of said first and second transistors;

first and second current transformers;

means connecting one end of said winding in series with the primary of said first transformer and the collector of said first transistor;

means connecting the other end of said winding in series with the primary of said second transformer and the collector of said second transistor;

means connecting the secondary of said first current transformer to the base of said first transistor; and means connecting the secondary of said second current transformer to the base of said second transistor.

7. The circuit as claimed in claim 6 and further including:

third and fourth transistor switches;

means grounding the emitters of said third and fourth transistors;

means coupling the secondaries of said first and second transformers in series with said third and fourth transistors respectively;

means coupling the base of said third transistor with the square wave drive to the base of the second transistor; and means coupling the base of said fourth transistor with the square wave drive to the base of the first transistor.

8. The circuit as claimed in claim 7 and further including:

a transformer interposed between the square wave generator and the base drive of said first and second transistors;

the secondary of said transformer being center tapped and grounded; and the primary of said transformer being center tapped and receiving a low voltage via a resistor; so that if said square wave generator fails, the transformer will saturate and block further current flow in the secondary of said transformer.

9. The circuit as claimed by claim 3 and further including a transient suppressor shunted across the winding of said motor driven by the circuit.